United States Patent [19]
Naruto

[11] Patent Number: 5,506,398
[45] Date of Patent: Apr. 9, 1996

[54] OPTICAL DATA RECORDING AND REPRODUCING APPARATUS AND METHOD EMPLOYING AN OPTICAL HEAD AT THE CENTER OF A SPHERICAL RECORDING MEDIUM

[75] Inventor: Michio Naruto, Kawasaki, Japan

[73] Assignee: Fujitsu Limited, Kawasaki, Japan

[21] Appl. No.: 365,863

[22] Filed: Dec. 29, 1994

[30] Foreign Application Priority Data

Jul. 8, 1994 [JP] Japan .................................. 6-157396

[51] Int. Cl.[6] ...................................................... G11B 3/70
[52] U.S. Cl. ........................................ 250/201.5; 369/272
[58] Field of Search ......................... 250/201.5; 369/272, 369/280; 360/131, 132, 136, 137

[56] References Cited

U.S. PATENT DOCUMENTS

| | | | |
|---|---|---|---|
| 2,170,090 | 10/1938 | Paul | 369/272 |
| 3,047,429 | 3/1959 | Stoller et al. | 369/280 |
| 3,883,216 | 5/1975 | Lee | 359/8 |
| 4,353,077 | 10/1982 | Gokey et al. | 369/272 |
| 4,802,160 | 1/1989 | Yamada et al. | 369/272 |
| 4,995,025 | 2/1991 | Shulze . | |
| 5,212,615 | 5/1993 | Gomez | 360/136 |
| 5,404,490 | 4/1995 | Matsubayashi et al. | 250/201.5 |

*Primary Examiner*—Edward P. Westin
*Assistant Examiner*—Steven L. Nichols
*Attorney, Agent, or Firm*—Staas & Halsey

[57] ABSTRACT

An optical disk drive which does not require a high precision servo mechanism and intensive error correction technique. The recording surface of a recording medium is stationary and is completed as a spherical or semi-spherical plane. An optical head is provided at the center of curvature. A laser beam emitted from the optical head, provided at the center of curvature, is displaced physically or electrically, without rotating the recording surface.

21 Claims, 12 Drawing Sheets

OPTICAL DATA RECORDING AND REPRODUCING APPARATUS AND METHOD EMPLOYING AN OPTICAL HEAD AT THE CENTER OF A SPHERICAL RECORDING MEDIUM

BACKGROUND OF THE INVENTION

1. Field of the Invention

The present invention relates to an optical data recording and reproducing apparatus and method, and more particularly, to an optical data recording and reproducing apparatus and method having a stationary recording medium with a spherical recording surface.

2. Description of the Prior Art

Conventionally, an optical disk drive irradiates a fiat recording surface of a disk type recording medium with a laser beam through an object lens, to focus on a recording surface for recording and reproducing data. The disk type recording medium is mounted on a spindle and rotates at a predetermined number of rotations. Recordation and reproduction of data are carried out by focusing the laser beam on the recording surface of the disk type recording medium with an optical head and fixing the beam to the predetermined track. A servo technique for focusing a laser beam is called "focusing," and fixing a beam to a track is called "tracking."

An optical disk drive can roughly be classified into three types, depending on a material of the recording layer coating the recording surface. A first type is called a read-only type which is mainly used as a video disk, compact disk (CD) and compact disk ROM (CD-ROM). In this type of optical disk drive, recording data is realized by mechanically or chemically providing permanent pits to the recording surface at the time of producing a recording medium and then forming an aluminum reflecting film on such projections and recesses. Meanwhile, reading and reproduction of data is realized by focusing a laser beam on this recording surface and sensing intensity or interference of the reflected beams.

A second type is called a write-once type which allows users to freely write data once, but does not allow users to write more data on the same recording area. Namely, an optical disk drive of this type allows only one writing of data to the recording area. Recording of data is generally realized by boring pits on the recording surface or changing the optical property to locally change a reflectivity of the recording surface by irradiating the recording surface with an intensified laser beam. The non-reversible change of such optical property allows only one recording of data. Reading and reproduction of data is realized, like the read-only type, by focusing the laser beam on such a recording surface and then sensing intensity or interference of the reflected light beam. Reproduction of data can be repeated as many times as desired.

Figure 1A:
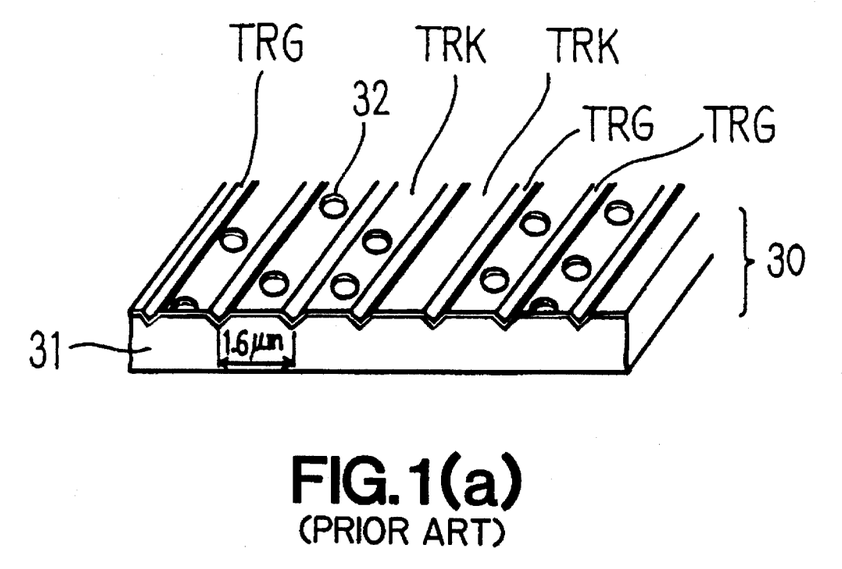
FIG. 1(a) (PRIOR ART) is a diagram for explaining a write-once type recording surface and FIG. 1(b) (PRIOR ART) is a diagram for explaining a principle of a reproduction of data.
Figure 1B:
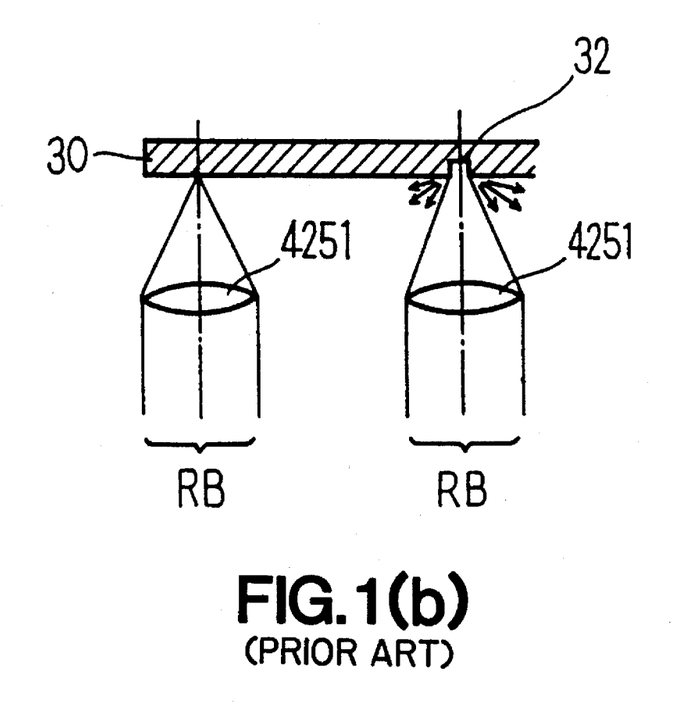

FIG. 1(a) (PRIOR ART) illustrates a recording surface of the write-once type optical disk drive. Tracks TRK are formed on a substrate 31 of the recording surface and grooves TRG are also formed between the tracks. The groove TRG is generally formed in the shape of the letter V having a width of 0.4 μm, depth of 70 nm and interval to the adjacent groove of about 1.6 μm. In the track TRK, pits 32 are bored by an intensified laser beam depending on the recording data bits "0" and "1" Reproduction of data is carried out as follows. When a track TRK is irradiated with a laser beam RB through an object lens 4251 as illustrated in FIG. 1(b) (PRIOR ART), the beam is almost reflected at the area where a pit 32 is not provided and returns to the object lens 4251. But at the area where a pit 32 is bored, the laser beam is diffracted by the pit and the reflected laser beam goes out of the sight of the object lens 4251 and only a part of the beam returns to the object lens 4251. Therefore, the stored data can be reproduced by sensing the returning laser beam with a photodiode.

A third type of an optical disk drive is a rewritable type which allows repeated recording of data to the target recording area. For the rewriting of data, it is an essential condition that a property of the recording surface can be changed reversibly with irradiation of a laser beam. Various methods for reversibly changing the property of the recording surface have already been proposed and a magneto-optical recording system and a phase change recording system are typical methods. In the magneto-optical recording system, recording is carried out by magnetizing the recording surface, consisting of a magnetic film, in one direction (erased condition) or locally inverting the magnetizing direction (recorded condition) with an external bias magnetic field and laser beam. The laser beam works to assist the inversion of the magnetizing direction and only the areas which are locally heated by irradiation of an intensified laser beam are inversed. Reading and reproduction of data can be conducted by irradiation of a weak laser beam. In this case, a change of a polarizing surface of the laser beam due to the magnetizing direction is detected with a detector by utilizing the Kerr effect and then the change is converted to an intensity of the laser beam.

Figure 2A:
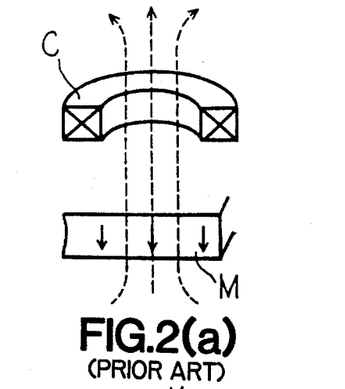
FIGS. 2(a), 2(b), 2(c), 2(d), 2(e), 2(f) and 2(g) (PRIOR ART) are diagrams for explaining principles of the recordation and reproduction of data of the magnetooptical recording system.
Figure 2B:
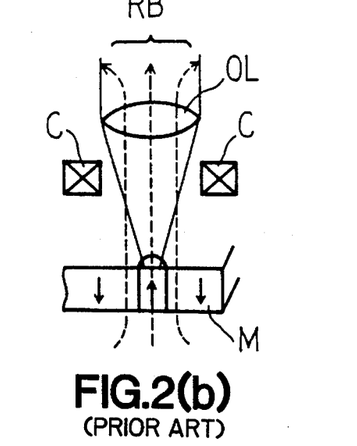

FIGS. 2(a)–(g) (PRIOR ART) are diagrams for explaining the recordation and reproduction principle of the magneto-optical recording system. As illustrated in FIG. 2(a), a magnetic field is applied with a recording coil C in the upward direction to a magnetic film M, when it is magnetized in the downward direction. Magnetic film M may be an alloy thin film, etc. of a rare earth metal and a transition metal such as MnBi thin film or TbFeCo deposited on a recording substrate. As illustrated in FIG. 2(b), when the magnetic film M is then irradiated with a laser beam RB through an object lens OL only at an area where the magnetizing direction is to be inverted, the magnetized direction of only such area is inverted to an upward direction, permitting the recording of data.

Figure 2C:
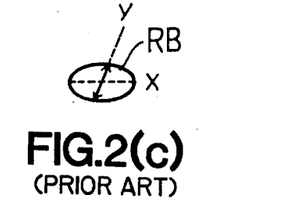
Figure 2D:
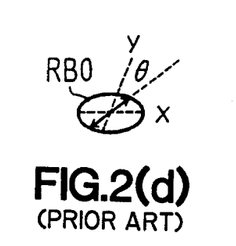
Figure 2E:
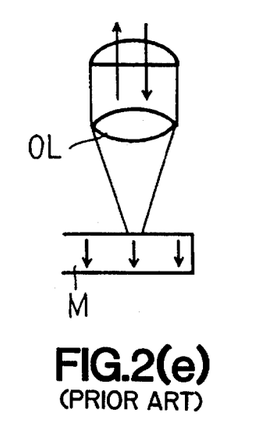
Figure 2F:
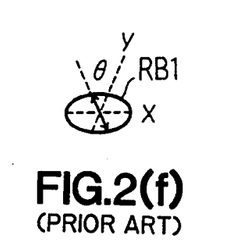
Figure 2G:
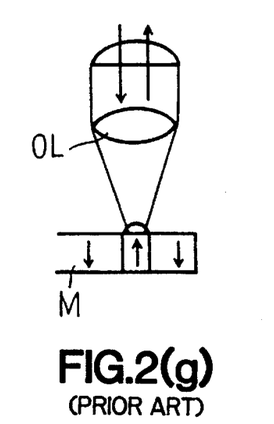

For the reproduction of recorded data, when the magnetic film M is irradiated with the laser beam RB having the polarizing surface in the direction of the y axis, as illustrated in FIG. 2(c), the reflected laser beam RB0, having a polarizing surface which is rotated by Θ in the clockwise direction as illustrated in FIG. 2(d), can be obtained by means of the Kerr effect in the area where the magnetizing direction is set downward, as illustrated in FIG. 2(e). Moreover, the reflected laser beam RB1, having a polarizing surface which is rotated by Θ in the clockwise direction as illustrated in FIG. 2(f), can be obtained at the area where the magnetizing direction is set upward, as illustrated in FIG. 2(g). Therefore, data can be reproduced by sensing the polarizing condition of the reflected laser beam. Meanwhile, a phase change recording system utilizes a change of the optical property of the recording surface. This is a change of reflectivity of the recording surface when the recording surface is quickly heated or cooled and gradually heated or cooled with the laser beam. This phase change recording system has a merit that a bias magnet which has been required in the magneto-optical recording system is no longer required.

In any type of optical disk drive, the focusing and tracking are very important because a disk type recording medium is rotated at a high speed and data is read and reproduced during rotation of the recording medium, as explained above. The disk type recording medium shows, during its rotation, a deflection of a surface as large as 0.2~0.3 mm. Therefore, if the object lens of an optical head is fixed, the focal point deviates from the recording surface on the recording medium, making it difficult to read and reproduce data. In the case of the write-once type or rewritable type, recording is also difficult. In order to always keep constant the distance between the lens and the recording surface, the object lens is generally moved perpendicular to the recording surface and is caused to follow the surface deflection of the recording medium. This may be realized by a Knife-edge method, an Astigmatic method or a Foucalt method.

Moreover, when the disk recording medium is set to the spindle of the optical disk drive for the rotation, an eccentricity of about 50 μm is generated between the laser beam emitted from the object lens and a track on the recording surface. This is due to axial deflection of the spindle and eccentricity of the center hole of the recording medium. For accurate recordation and reproduction of data, it is essential that the laser beam can accurately follow the tracks. For this purpose, a push-pull method and a three-beam method have been proposed.

As described above, an optical disk drive of the prior art is required to provide a tracking and compensating device in order to eliminate deflection due to surface deflection, axial deflection of a disk type recording medium during rotation thereof, and eccentricity of the center hole of the recording medium. Therefore, accuracy of the tracking and compensating device causes a certain restriction on the high density and high rotating speed of the optical disk drive. Moreover, a reproduction error is inevitably increased and an intensive error correcting technique is also required for eliminating the influence of such reproduction error. In addition, a large number of redundancy bits are necessary for error correction, thereby limiting a substantially higher density.

In view of solving the foregoing problems, U.S. Pat. No. 4,995,025 has been proposed. U.S. Pat. No. 4,995,025 discloses an optical disk drive where a plate type recording medium having a curved surface is stationarily fixed and an optical head swings around a pivot shaft. However, in this optical disk drive, one end of the optical head is located at the pivot shaft, while the other end is approximated at the recording medium surface. Therefore, the gravity center of the optical head is isolated from the pivot shaft. Moreover, acceleration and deceleration periods are necessary for reciprocally swinging the optical head. Accordingly, a large force is required for swinging this optical head at a high speed. Actually, it is impossible to move such an optical head at a high speed.

SUMMARY OF THE INVENTION

It is therefore an object of this invention to provide an optical disk drive utilizing a spherical or a semi-spherical recording medium.

It is another object of the present invention to provide an optical disk drive which can rotate an optical head at a high speed.

It is a further object of the present invention to provide an optical disk drive which does not use a high precision servo mechanism, but instead can be realized with a simple and low cost servo mechanism.

It is still a further object of the present invention to provide an optical disk drive which does not use an intensive error correcting technique and error correction code to increase a capacity of user data.

Objects of the present invention can be achieved by forming a spherical or semi-spherical recording surface of a recording medium, providing an optical head to the center of curvature of the recording medium and electrically or physically displacing the laser beam irradiated from the optical head located at the center of the curvature, without rotating the recording medium.

BRIEF DESCRIPTION OF THE DRAWINGS

FIGS. 11a1 and 11b are cross-sectional views of a spherical recording medium having a recording surface of a multilayer structure according to the present invention.

DETAILED DESCRIPTION OF THE PREFERRED EMBODIMENTS

Figure 3:
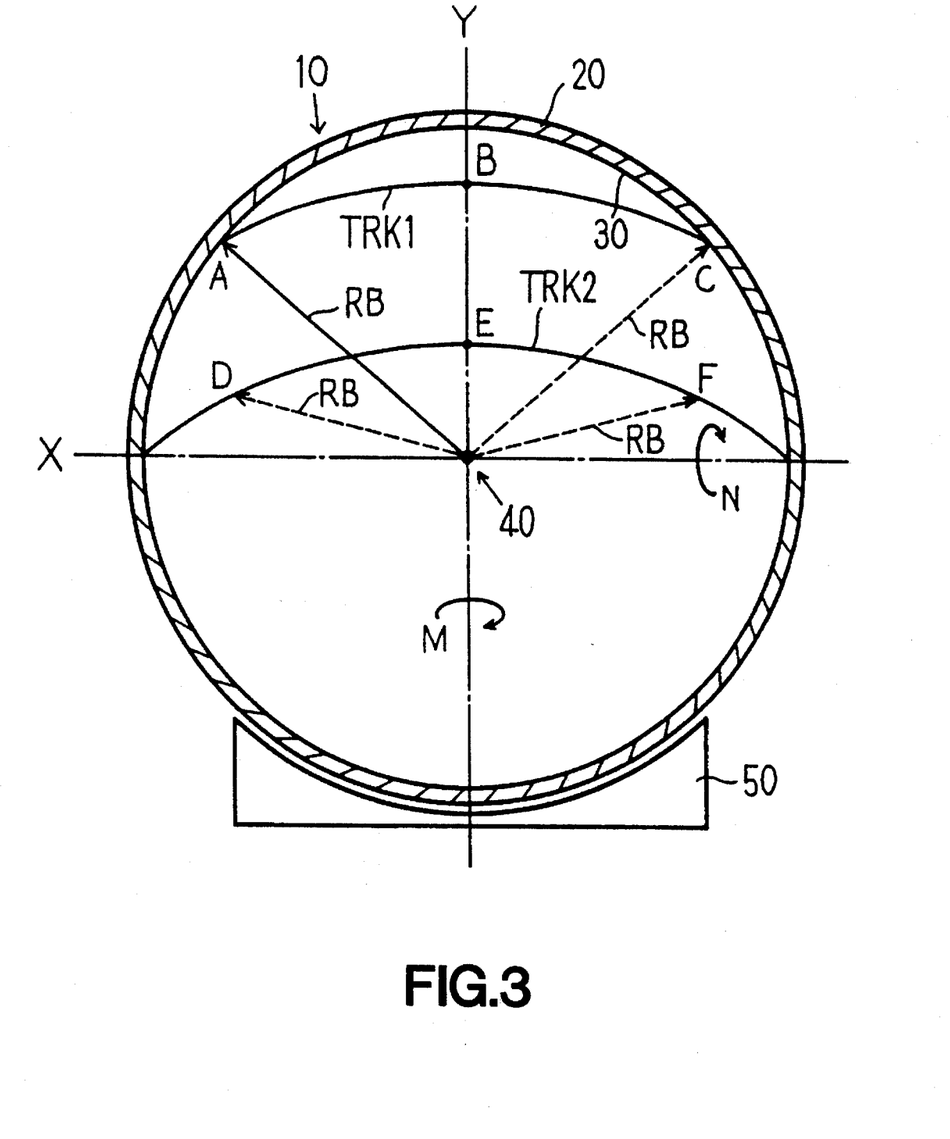
FIG. 3 is a diagram for explaining the principle of an optical data recording and reproducing apparatus of the present invention.

FIG. 3 illustrates the principe of an optical data recording and reproducing apparatus of the present invention. In FIG. 3, the numeral 10 designates an optical data recording and reproducing apparatus as a whole; 20, a spherical recording medium (cross-sectional view); 30, a recording surface provided on the recording medium; 40, an optical head provided at the center of curvature of the spherical recording medium; 50, a supporting base on which the spherical recording medium is mounted. RB designates a laser beam.

The recording medium 20 has a spherical surface 30 at its internal surface. Recording medium 20 can be fixed or removably mounted on the supporting base 50. The recording medium does not rotate, unlike a disk type recording medium of the prior art, and allows the recordation and reproduction of data under a stationary condition. The recording surface 30 is coated by a recording layer material with a method similar to a disk type recording medium of the prior art. Any one of the three types described above, that is, read-only type, write-once type or rewritable type, can be used. In the following explanation, it is assumed that the coating is conducted to obtain the write-once type recording medium. As in the case of the disk type recording medium, concentric or spiral tracks TRK are formed on the recording surface 30. In FIG. 3, a track TRK 1 including the points A, B, C and a track TRK 2 including the points D, E, F are typically indicated. Although not illustrated in FIG. 3, the optical head 40 is rotatably and swingingly attached to the supporting base 50 and other support structures.

Recordation and reproduction of data will now be explained. Recording of data can be realized by boring pits on a recording layer as a result of focusing on the recording surface 30 by irradiating this surface with an intensified laser beam RB from an optical head 40. Continuous recording on the tracks TRK is enabled by rotating the optical head 40 along the Y axis in the direction indicated by the arrow mark M at the predetermined speed, for instance, 1800 RPM so that the leaser beam RB can be moved on the track TRK 1 passing the points A, B, C on the recording surface. Selection of each track can be made by swinging the optical head 40 in the direction orthogonally crossing the Y axis, for instance, in the direction indicated by the arrow mark N along the X axis. For example, recording of data to the desired track can be realized by moving the beam RB to the point D from the point A, rotating the optical head 40 in this position in the direction of arrow mark M to move the beam RB on the track TRK 2 passing the points D, E, F.

Reproduction of data can be realized by irradiating the recording surface with the beam RB from the optical head 40 and focusing the beam thereon to detect the intensity or interference of the beam reflected from the focal point with a sensing mechanism provided within the optical head 40. Selection of the track and continuous reproduction from the selected track can be realized, as in the case of the recording operation, by swinging and rotating the optical head 40 in the directions of arrow marks N and M. As explained above, the present invention executes recordation and reproduction of data while the recording medium is set in the stationary condition. Therefore, positional deviation due to surface deflection, axial deflection, and eccentricity of the center hole of the medium resulting from rotation of a disk can be eliminated, in comparison with the method of the prior art where a disk type recording medium is rotated. Therefore, a highly accurate tracking and compensating device is not required in the present invention.

In the apparatus of the present invention, even when some focusing or tracking operation is required in order to continuously record or reproduce data on the tracks or to select tracks, recordation and reproduction of data can be conducted only by setting the optical head at the center of the sphere and displacing the optical head (i.e., displacing the laser beam) while the recording medium is set in the stationary condition. Accordingly, highly accurate focusing and tracking can be realized with a more simplified servo mechanism than that of the disk type optical disk drive. Moreover, swinging and rotating in the directions indicated by the arrow marks M and N of the optical head 40 are not always required to be a physical displacement. For instance, it is enough to optically displace the beam RB from the optical head 40 in the directions of arrow marks M and N. In this case, higher accurate focusing and tracking than the physical displacement can be realized.

Figure 4:
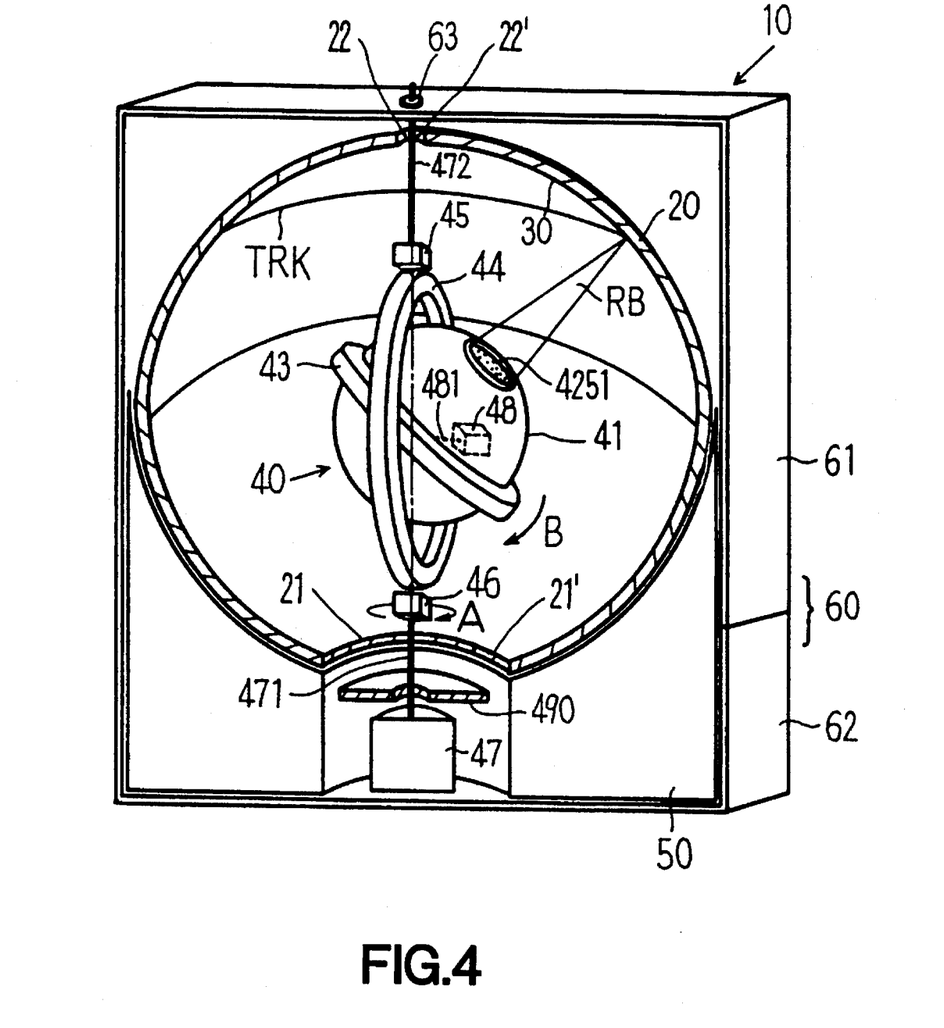
FIG. 4 is a cross-sectional view of an optical disk drive of the present invention.

FIG. 4 illustrates a cross-sectional view of an optical disk drive of the present invention. For the convenience of explanation, an optical head is enlarged more than a recording medium. In FIG. 4, numeral 10 designates an optical disk drive as a whole; 20, a spherical recording medium; 30, a recording surface provided on the medium; 40, an optical head provided at the center of the curvature of the spherical recording medium; 41, a head housing; 4251, an object lens for irradiating and focusing a laser beam on the recording surface; 43, 44, 45, 46, rings and poles for swingingly supporting the head housing 41. Numeral 47 designates a motor for rotating a ring 44 at the speed, for example, of 1800 RPM in the direction of arrow mark A; 48, a stepping motor for swinging a ring 43 in the direction of arrow mark B; 490, a printed circuit board on which a drive unit is disposed (illustrated in detail in FIG. 7); 50, a supporting board; 60, a case for accommodating the entire part of the apparatus, divided into an upper cover 61 and a lower cover 62. The upper part of the optical head 40 is rotatably fixed to the upper cover 61 with a pole 45, a supporting shaft 472 and a holding tool 63. The lower part of the optical head 40 is fixed to the lower cover 62 through a pole 46, a motor shaft 471 and the motor 47.

Figure 5:
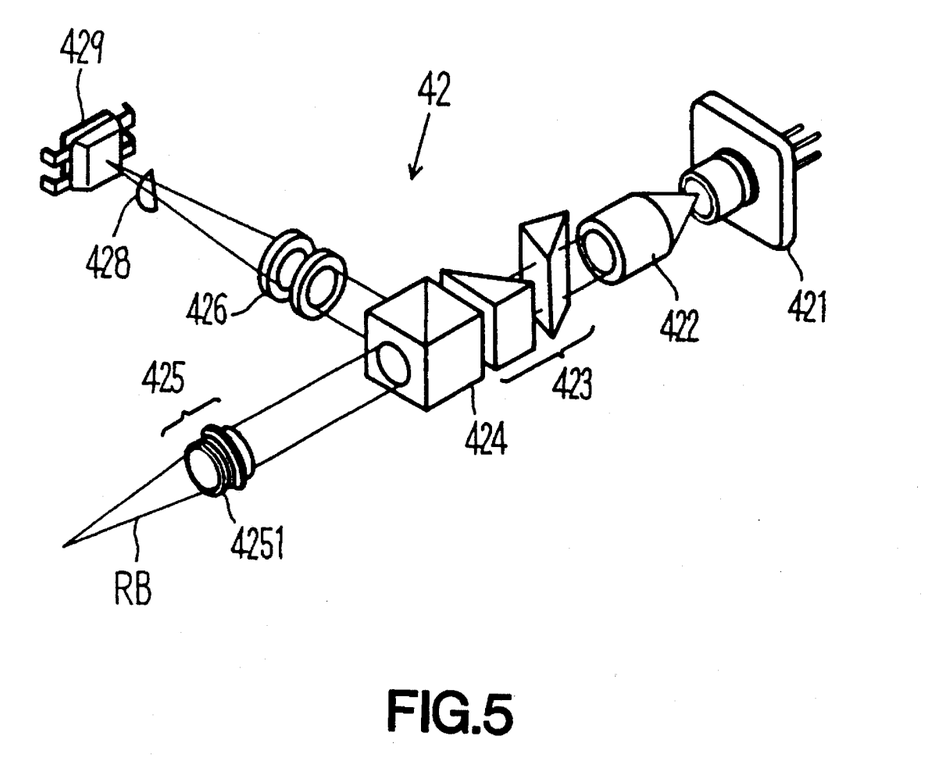
FIG. 5 is a diagram for illustrating an optical system for recording and reproducing data according to the present invention.
Figure 6A:
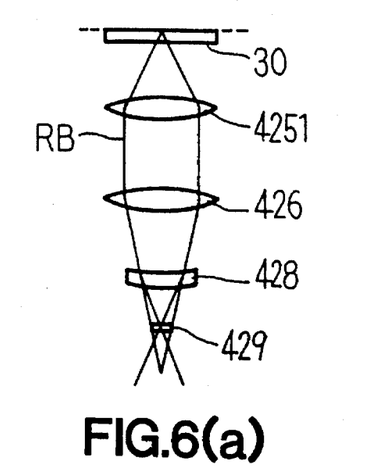
FIGS. 6(a), 6(b), 6(c), 6(d) and 6(e) are diagrams for explaining a focusing error signal according to the present invention.
Figure 6B:
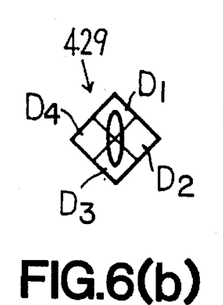
Figure 6C:
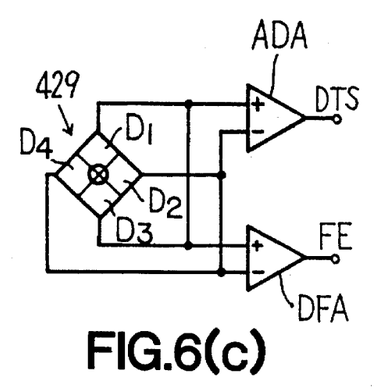
Figure 6D:
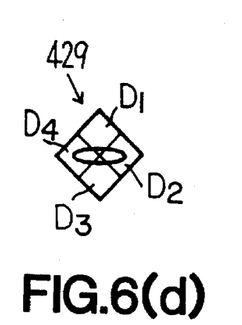
Figure 6E:
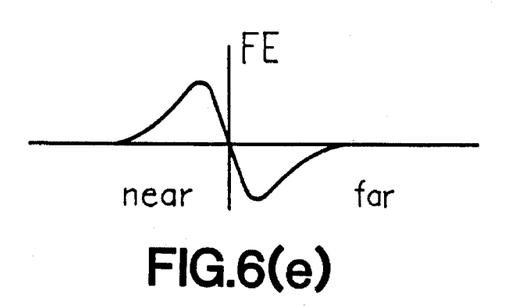

The recording medium 20 has a spherical shape which is fixed (removably) to the supporting base 50 for enabling the recordation and reproduction of data under the stationary condition without rotation thereof, unlike the disk type recording medium of the prior art. The recording medium 20 is divided at the positions through which the shafts 471, 472 are inserted. Each of the divided two semi-spherical recording media have two notches 21 and 22, and 21' and 22', respectively, at the positions through which the shafts 471, 472 are inserted. A through-hole is formed by each of the two sets of notches, i.e., notches 21 and 22 of one semi-spherical medium and respective notches 21' and 22' of the other semi-spherical medium, when the two semi-spherical mediums are joined to each other. An optical system 42 illustrated in FIG. 5 is comprised in the head housing 41 so that the laser beam RB follows the concentric or spiral track TRK provided on the recording surface 30 through the object lens 4251.

In FIG. 4, the object lens 4251 is illustrated as if it exists at the surface of the head housing 41. Object lens 4251 is, however, actually freely provided in the head housing 41, with the internal center of the recording medium 20 matching the center of revolution of the optical head 40. It is, of course, possible to provide the object lens 4251 at the surface of the head housing 41, as apparently illustrated in the figure, when the head housing 41 also has a spherical shape and the distance between the object lens and recording surface 20 is always kept constant.

Tracking for track TRK is carried out by rotating the rings 43, 44. The ring 44 is attached to the poles 45, 46 so that it can be rotated in the direction of the arrow mark A at the speed, for example, of 1800 RPM. When the ring 44 rotates in the direction of arrow mark A, tracking to the predetermined track TRK can be realized. Namely, when the shaft 471 of motor 47 rotates in the direction of the arrow mark A, the rings 44, 43 and head housing 41, namely optical head 40, rotate in the direction of arrow mark A at the predetermined number of rotations, causing the laser beam RB radiated from the optical head 40 to move along the track TRK of the recording medium 20.

Furthermore, the ring 43 is attached to the ring 44 and is swingable in the direction of the arrow mark B. When the ring 43 and optical head 40 swing in the direction of the arrow mark B, the laser beam RB moves perpendicularly to the direction of tracks to select the predetermined track TRK. For example, a stepping motor 48 rotates for the specified amount to swing the ring 43 in the direction of arrow mark B through the shaft 481 depending on the instruction from a head access control circuit 492 (see FIG. 7). Thereby, the ring 43 and head housing 41 rotate for the specified amount to move the laser beam RB radiated from the optical head 40 for the specified amount in the vertical direction in view of selecting the predetermined track TRK. Since the laser beam RB radiated from the object lens 4251 irradiates perpendicular to the recording surface 30, because the optical head 40 is located at the center of sphere, the reflected beam is reflected toward the object lens 4251 and the recorded data can be detected by the optical system 42 illustrated in FIG. 5.

FIG. 5 illustrates a basic constitution of an optical system 42 for data recordation and reproduction. 421 designates a semiconductor laser; 422, a collimator lens; 423, a sphere compensation prism; 424, a beam splitter for transmitting the beam from the semiconductor laser and reflecting the beam reflected from the recording surface to the signal detection side; 425, an actuator comprising the object lens 4251, a focusing coil provided (not illustrated) for fine-adjusting the object lens in the focusing direction and a data recording coil, etc.; 426, a convergent lens; 428, a cylindrical lens; 429, a beam sensor. The laser beam RB from the semiconductor laser 421 is converted to have the spherical cross-section with the collimator lens and the sphere compensation prism 423 and reaches the actuator 425 passing through the beam splitter 424. The laser beam RB having reached the actuator 425 is focused on the predetermined track TRK on the recording surface with the object lens 4251.

When a pit is bored at the focal point, the laser beam RB is diffracted by the pit 32 as illustrated in FIG. 1(*b*) and a greater part of the reflected beam goes out of the sight of the object lens 4251. When the pit 32 is not bored, the laser beam is almost reflected and returns to the object lens 4251 as illustrated in FIG. 1(*b*). The reflected beam RB is guided to the beam sensor 429 by the beam splitter 424 through the convergent lens 426 and the cylindrical lens 428.

The cylindrical lens 428 operates as a lens for only one direction, and does not operate as a lens for the direction perpendicular to the one direction, but acts as a parallel plate. Therefore, the focus distance is different in the respective directions, resulting in astigmatism. Thus, the beam sensor 429 consisting of the 4-split photodiode is arranged at the position where the cross-section of the beam of the astigmatism optical system becomes a circular shape when the recording surface is located at the focal plane of the object lens 4251, as illustrated in FIG. 6(*a*). When the recording surface 30 comes near the object lens 4251, the cross-section of the laser beam RB is vertically elongated as illustrated in FIG. 6(*b*). Meanwhile, when the recording surface 30 is located at the focal plane of the object lens 4251, the beam RB becomes circular as illustrated in FIG. 6(*c*). When the recording surface 30 becomes far from the object lens 4251, the cross-section of the laser beam RB is horizontally elongated as illustrated in FIG. 6(*d*).

Accordingly, when a detected signal of the 4-split diodes D1~D4 is differentially amplified with a differential amplifier DFA as illustrated in FIG. 6(*c*), a focus error signal FE as illustrated in FIG. 6(*e*) can be obtained. The position of the object lens 4251 in the direction to the recording surface is adjusted by driving the focus actuator in the actuator 425 so that the focus error signal FE becomes zero. Moreover, a reproduced signal DTS can be obtained by combining the detected signals of the 4-split diodes D1~D4 with an adder amplifier ADA as illustrated in FIG. 6(*c*).

Figure 7:
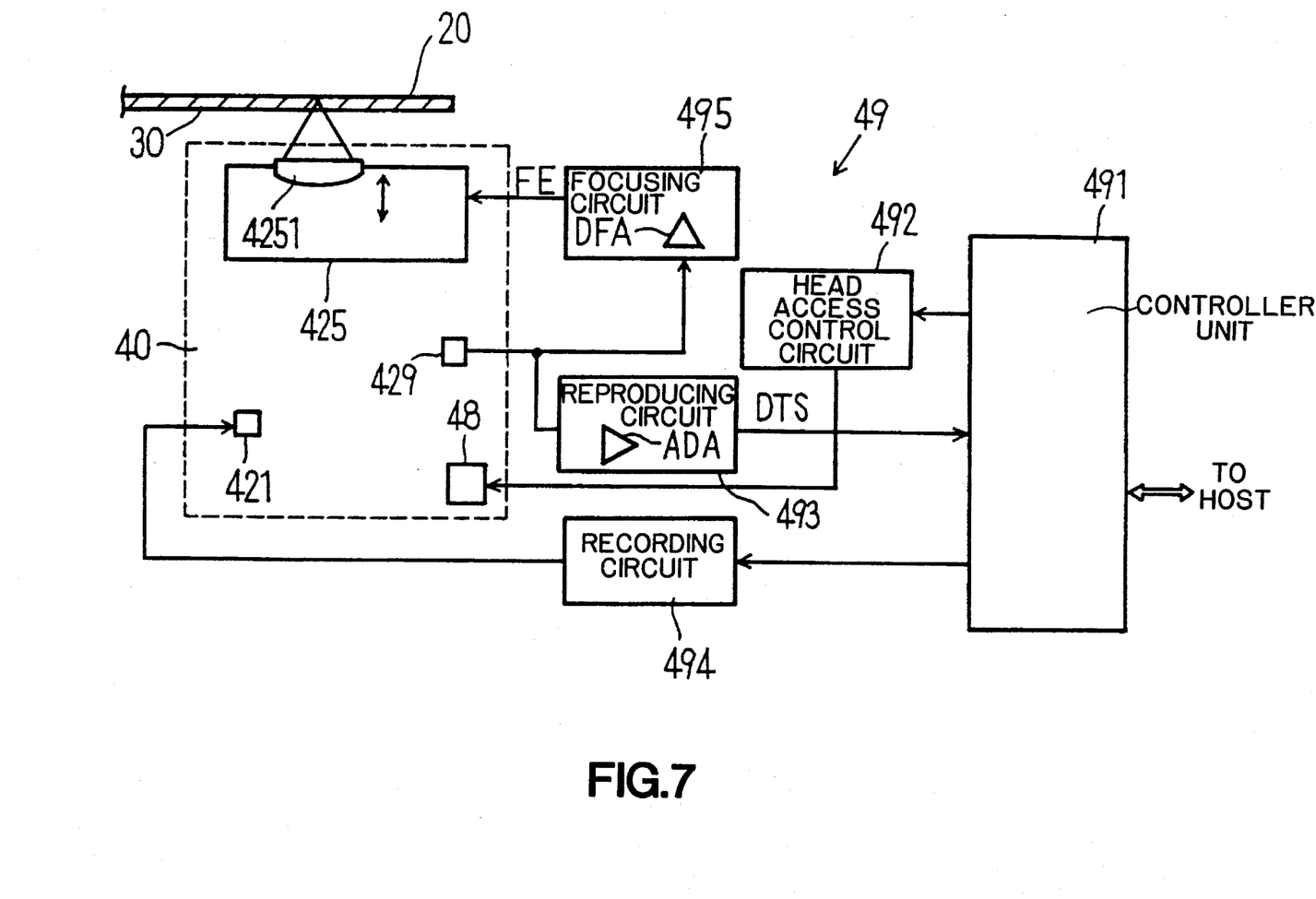
FIG. 7 is a diagram for illustrating a control circuit according to the present invention.

FIG. 7 is a structural diagram of a control circuit 49. 491 designates a controller unit comprising a microcomputer which controls an optical disk drive depending on an instruction from a host system. For example, controller unit 491 controls the positioning of the head and controls data recordation and reproduction. 492 designates a head access control unit for positioning the optical head 40 to the predetermined position depending on an instruction from the control unit 491. 493 designates a reproducing circuit for reproducing data recorded on the recording surface. 494 designates a recording circuit for data recording. 495 designates a focusing servo circuit for conducting focusing servo control.

The controller unit 491 receives a data reproduction instruction from a host system and positions the optical head 40 to the designated address (track) with the head access control circuit 492, causing the head 40 to read the data recorded on the recording surface. The optical head 40 inputs the signal detected by the lens 4251 and beam sensor 429 to the data reproducing circuit 493 and the data reproducing circuit 493 reproduces data from the signal input from the detector 429, and inputs the data to the controller unit 491 to output therefrom the data to the host system. Moreover, when the controller unit 491 receives a data recording instruction from the host system, the head access control unit 492 positions the optical head 40 to the designated address (track) and records the data to be recorded on the recording surface by turning on and off the semiconductor laser 421 depending on the recording data.

Figure 8:
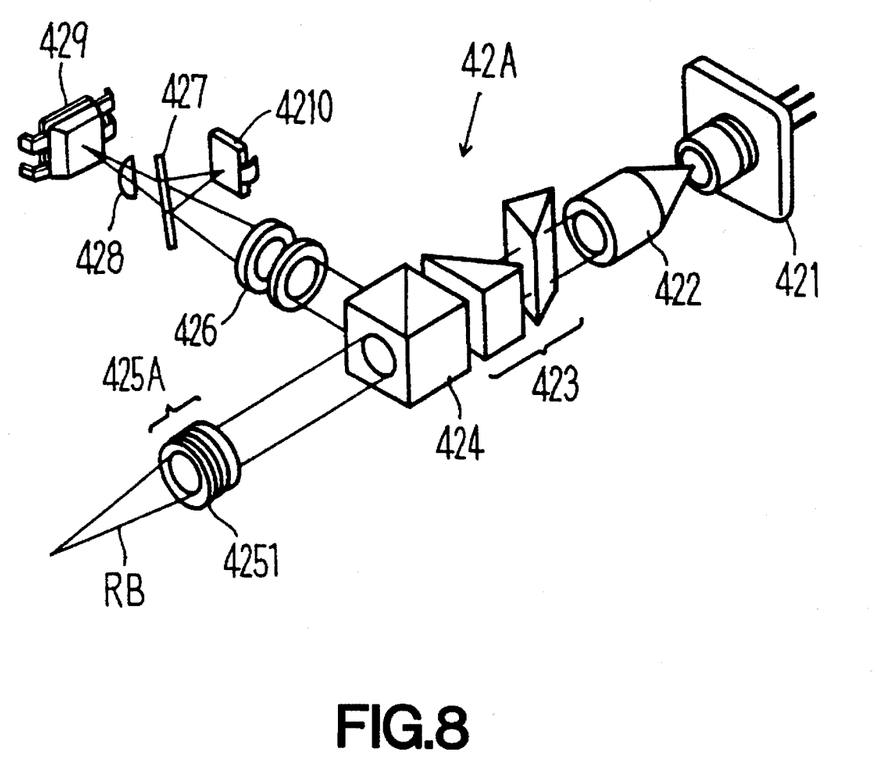
FIG. 8 is a diagram for illustrating another optical system for recording and reproducing data according to the present invention.

FIG. 8 is a diagram illustrating a basic constitution of another optical system 42A for data recordation and reproduction. Differences between this optical system 42A and the optical system 42 of FIG. 3 are that a half-mirror 427 and a beam sensor 4210 for tracking are provided in the optical system 42A and an object lens 4251 and a tracking coil (not illustrated) for fine-adjusting the lens in the tracking direction are provided in the actuator 425A. Recordation and reproduction of data and focusing are similar to those of FIG. 5 and therefore not explained here. The reflected beam RB from the recording surface is partly guided to the beam sensor 4210 through the half-mirror 427.

Figure 9A:
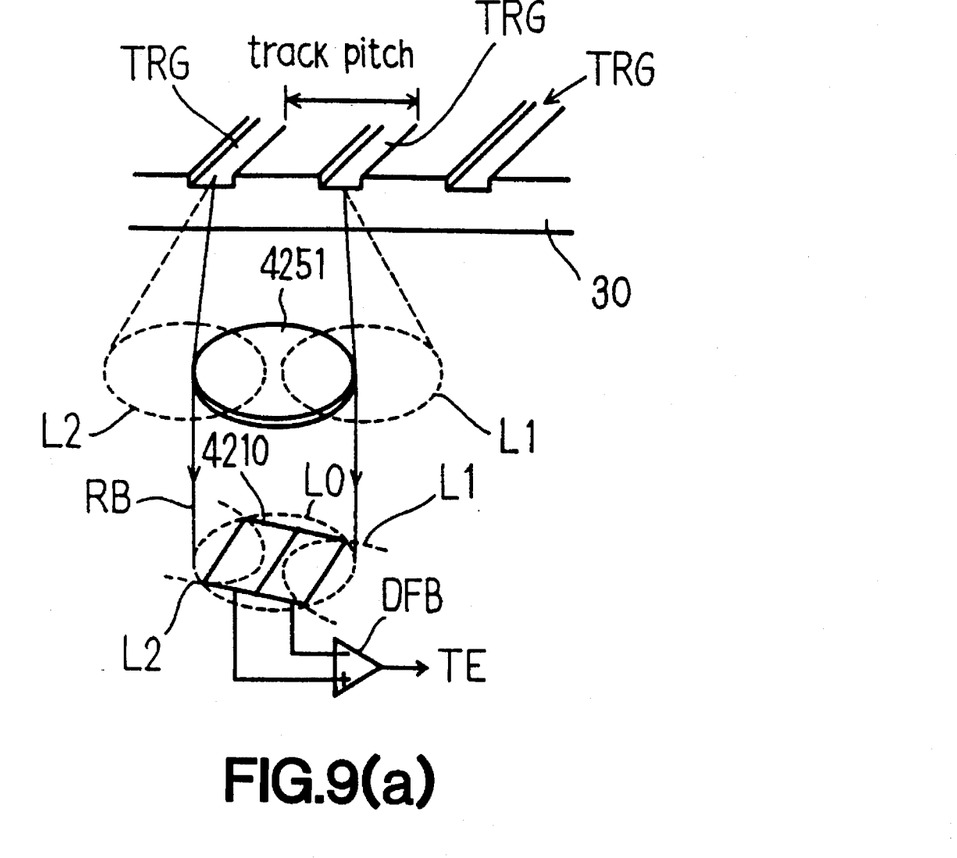
FIGS. 9a and 9b are diagrams for explaining a tracking error signal according to the present invention.
Figure 9B:
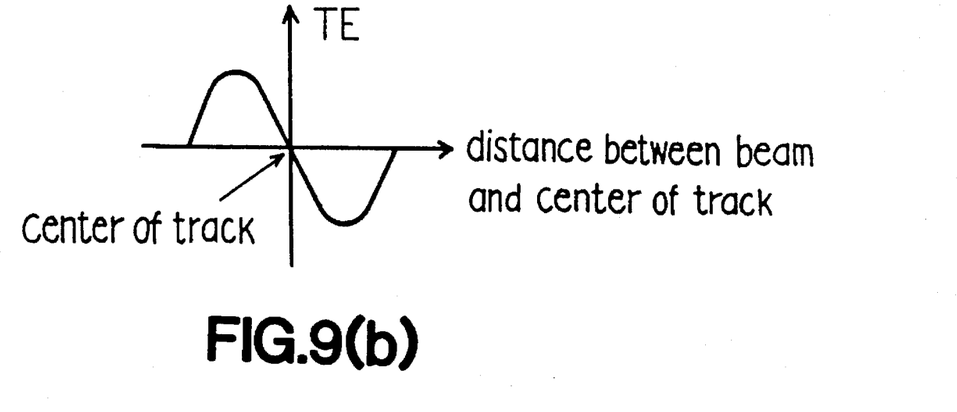

Track guides TRG are also provided on the recording surface as illustrated in FIG. 9(*a*) for the convenience of tracking servo. The track guides TRG works as a diffraction grating when the diameter of laser beam RB matches the track pitch and generates the diffracted beam L0 of the 0th order and the diffracted beams L1, L2 of the ±1st order. When the laser beam RB is positioned at the center of the track TRK (intermediate point of the adjacent track guides), the diffracted beams L1, L2 of the ±1st order are generated symmetrical to the track center. When each diode output of the beam sensor 4210 constituted by the 2-split photodiodes arranged symmetrical to the track center is amplified by a differential amplifier DFB, a tracking error signal TE of zero output signal can be obtained when the beam is on track. If the laser beam RB deviates to the right or left side form the track center, a tracking error signal TE of the waveform shown in FIG. 9(*b*) can be obtained depending on such deviation. Therefore, position of the object lens 4251 is adjusted by driving a tracking coil in the actuator 425A so that the tracking error signal TE becomes zero.

Figure 10:
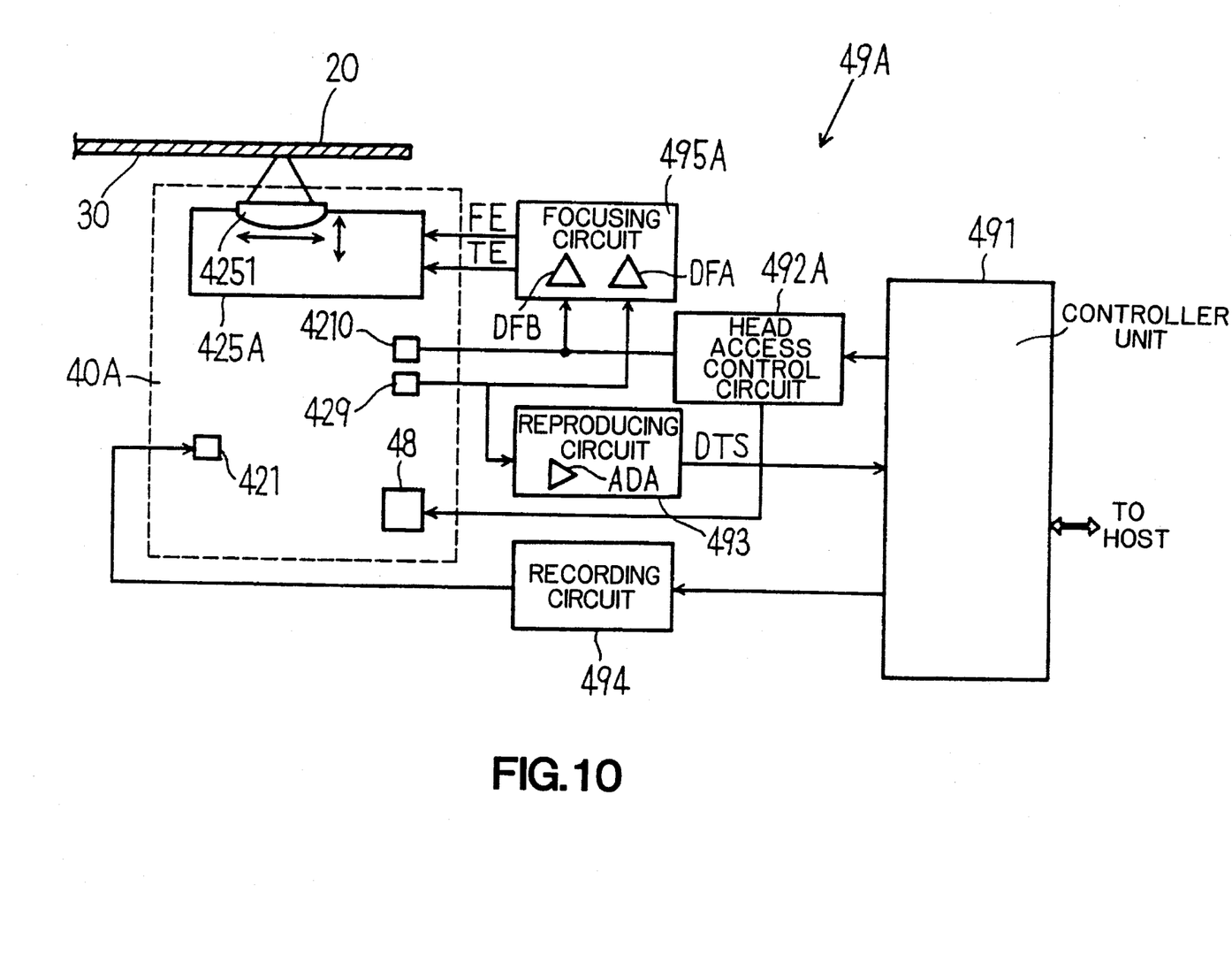
FIG. 10 is a diagram for illustrating another control circuit according to the present invention.

FIG. 10 is a diagram illustrating a constitution of another optical disk drive 49A. Differences from the optical disk drive 49 of FIG. 7 are that a servo circuit 495A is formed by providing a differential amplifier DFB to the circuit shown in FIG. 9(*a*) and a signal from the beam sensor 4210 is input to the servo circuit 495A and head access control circuit 492A. Operations of this circuit are similar to that of the control circuit of FIG. 7, except for the tracking servo, and are not explained here. When a signal from the beam sensor 4210 is input to the servo circuit 495A, a tracking error signal TE is generated depending on the irradiation position of the laser beam RB as explained regarding FIGS. 9(a), (b). Signal TE is supplied to a bidimensional actuator 425A for the purpose of fine adjustment for the position of the object lens 4251. Moreover, the signal from the beam sensor 4210 is also input to the head access control unit 492A in order to control the stepping motor 48 as required.

Figure 11A:
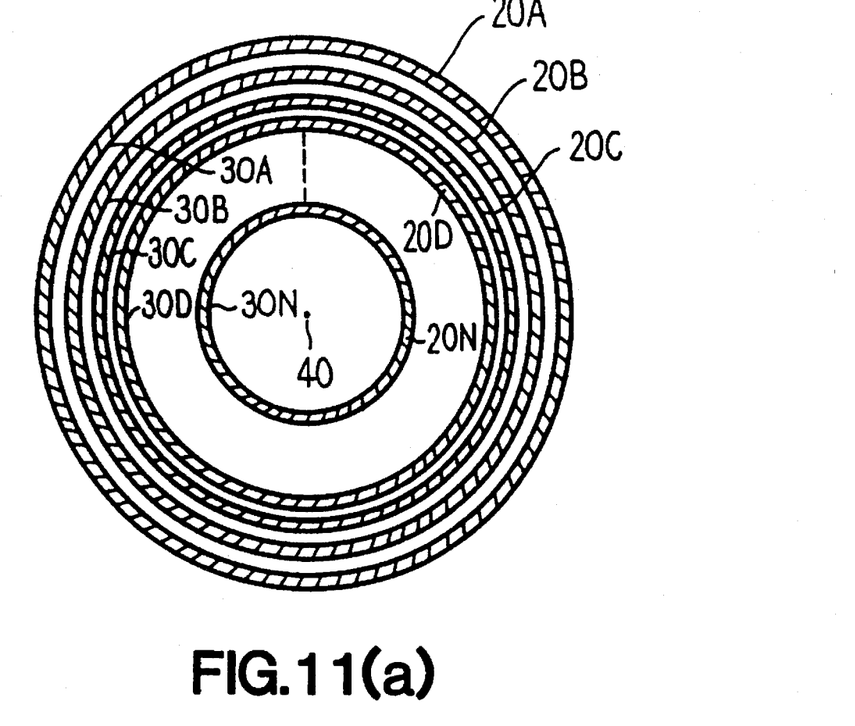
Figure 11B:
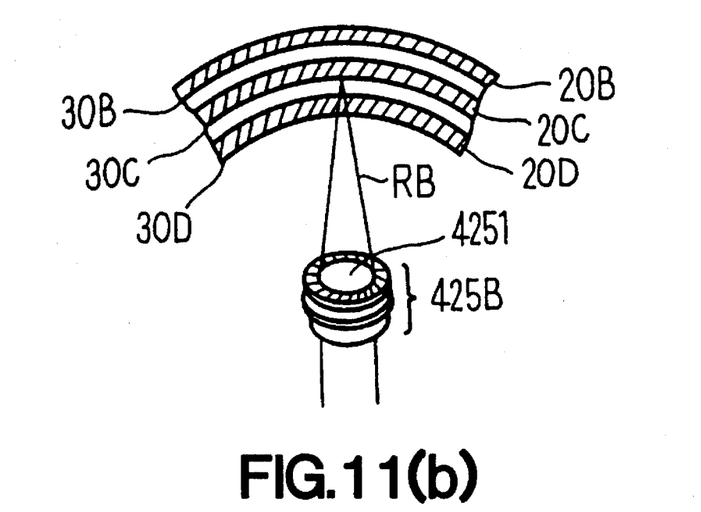

FIG. 11 illustrates an example of the recording surface of a multilayer structure of the spherical recording medium. As shown in FIG. 11 (a), the recording medium has a multilayer structure consisting of layers 20A~20N. Each layer has a respective recording surface 30A~30N. The laser beam RB from the optical head 40 is focused on the desired recording surface of each recording surface 30A~30N, and data can be reproduced by sensing the reflected beam RB from the recording surface with the optical head 40. Focusing of the laser beam RB on the desired recording surface. That is, selection of the desired recording surface, can be realized with the bidimensional actuator 425B as illustrated in FIG. 11(b). The bidimensional actuator 425B is almost similar to the bidimensional actuator 525A illustrated in FIG. 8. Actuator 425B displaces the object lens 4251 in the recording surface direction to focus the laser beam RB on the desired recording surface by controlling the focusing coil provided therein with the signal from the head access control unit of the optical disk drive.

An optical data recording and reproducing apparatus comprising a disk type recording medium having a recording surface of multilayer structure has been proposed in the U.S. Pat. Nos. 5,202,875 and 5,255,262. An almost similar recording and reproducing technique can also be applied to the optical disk drive of the present invention, utilizing a spherical recording medium having a multilayer structure recording surface.

Figure 12:
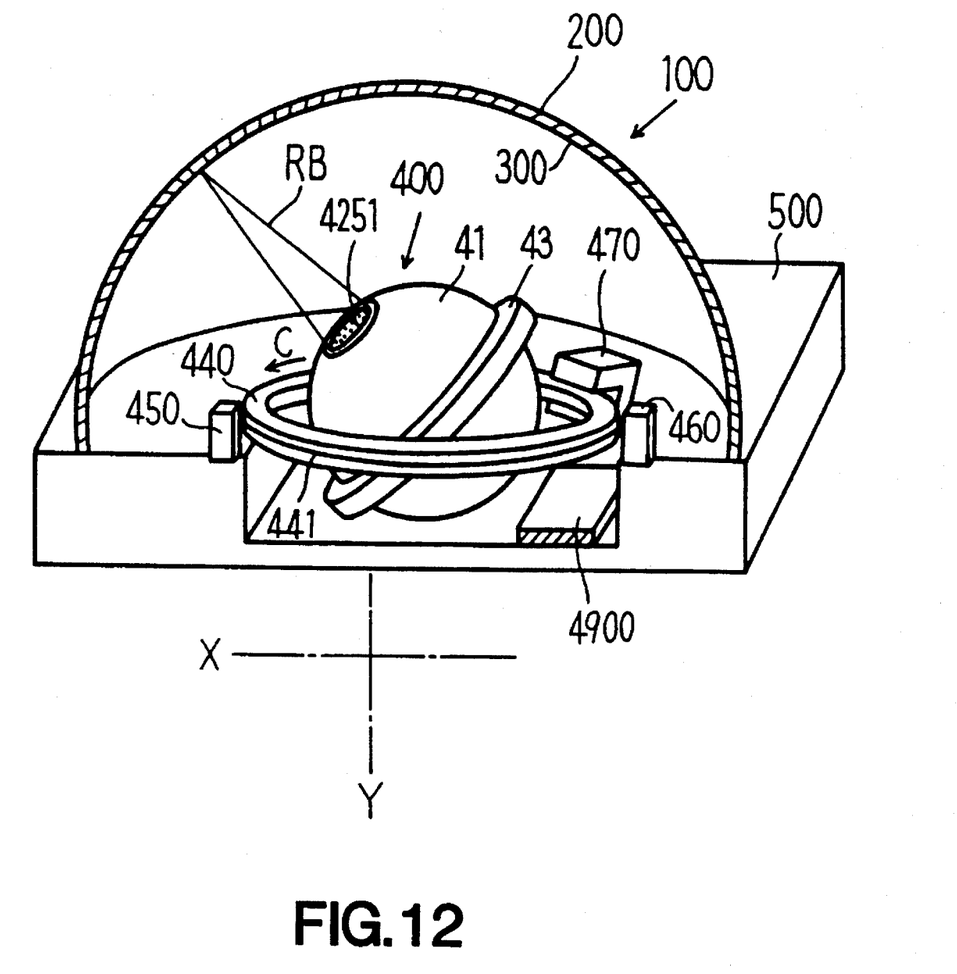
FIG. 12 is a cross-sectional view of another optical disk drive of the present invention.

FIG. 12 illustrates another embodiment of an optical disk drive utilizing a recording surface having a semi-spherical plane, according to the present invention. In FIG. 12, 100 designates an optical disk drive as a whole; 200, a semi-spherical recording medium; 300, a semi-spherical recording surface provided on an internal surface of recording medium 300; 400, an optical head provided at the center of a spherical space defined by the semi-spherical recording medium. Numeral 41 designates a head housing providing therein an optical system illustrated in FIG. 5 and FIG. 8. 4251 is a focal lens (object lens) similar to that shown in FIG. 4 for irradiating and focusing a laser beam on the recording surface.

Numerals 43 and 440 designate rings for swingingly supporting the head housing 41. The ring 440 is made of a conductor and forms a both-side 2-phase linear motor with a coil 470 and rotates as a rotor in the direction of the arrow mark C. The both-side 2-phase linear motor is widely known as a turn table driving motor and the both-side 2-phase linear motor consisting of the ring 440 and coil 470 can be constituted with the same principle. 450, 460 are poles for rotatably holding the head housing 41 by utilizing a guide 441 provided on the ring 440. 4900 is a printed circuit board on which the control circuit is disposed (details are illustrated in FIG. 7 and FIG. 10); 500 is a supporting base. The recording and reproducing operations are the same as those in FIG. 4, except for the point that the ring 440 rotates in the direction of arrow mark C along the Y axis, and therefore not explained here. FIG. 12 illustrates an example where the recording surface is formed of a single layer. The semi-spherical recording medium may also have a multilayer structure, as illustrated in FIG. 11.

The present invention is a novel optical data recording and reproducing apparatus and method which solves the problems of the optical data recording and reproducing apparatus of the prior art utilizing a disk type recording medium. For example, the present invention does not require a high precision servo mechanism, which has been required for using the disk type recording medium of the prior art. Furthermore, the present invention provides an optical data recording and reproducing apparatus and method which does not require an intensive error correcting technique, as required in the apparatus of the prior art.

While the invention has been particularly shown and described with reference to preferred embodiments thereof, it will be understood that the foregoing and other changes or modifications in form and details can be made therein without departing from the spirit and scope of the invention.

What is claimed is:

1. An apparatus for optically recording and reproducing data, said apparatus comprising: a base;

a stationary recording medium mounted to said base and having a spherical medium surface on an inside surface of said recording medium, said spherical medium surface having a center of curvature;

an optical head located at the center of curvature having a beam source for emitting a beam to said recording medium and a beam sensor for receiving and sensing a beam reflected from said recording medium;

supporting means for rotatably supporting said optical head about a rotational point, said rotational point being located at said center of curvature; and an actuator for rotating said optical head.

2. An apparatus of claim 1, wherein said supporting means has a first supporting member for rotatably supporting said optical head about a first axis and a second supporting member for rotatably supporting the first supporting member with said optical head about a second axis, said first and second axis perpendicularly crossing each other at said center of curvature; and wherein said actuator has a first motor for rotating said optical head about the first axis and a second motor for rotating the first supporting member with said optical head about the second axis.

3. An apparatus of claim 2, wherein said first motor is mounted on said optical head.

4. An apparatus of claim 2, wherein said second motor is mounted on said base and outside of said recording medium.

5. An apparatus of claim 2, wherein said first supporting member has a ring portion and two shaft portions, said ring portion rotatably supporting said optical head about said first axis, each said shaft portion rigidly mounted on said ring portion in the direction of the second axis and rotatably supported by said second supporting member.

6. An apparatus of claim 5, wherein said second motor and said second supporting member are mounted on said base and outside of said recording medium; and wherein said recording medium has two through-holes for respectively passing said two shaft portions, one of said two shaft portions being connected to said second motor.

7. An apparatus of claim 1, wherein said recording medium includes two separable medium portions, each said medium portion having a semi-spherical medium surface.

8. An apparatus of claim 6, wherein said recording medium includes two separable medium portions, each of said medium portions having a semispherical medium surface and two notches, said semi-spherical medium surfaces forming the spherical medium surface when said two medium portions are joined to each other, each of said two notches forming said two through-holes when said two medium portions are jointed to each other.

9. An apparatus of claim 1, wherein said optical head has an objective lens and a focusing actuator, said focusing actuator focusing the objective lens on said spherical medium surface.

10. An apparatus of claim 1, wherein said recording medium has a plurality of overlaid spherical medium surfaces, each of said overlaid spherical medium surfaces having a spherical surface and a center of curvature, each said center of curvature being located on a same point; and wherein said optical head has an objective lens and a focusing actuator, said focusing actuator focusing the objective lens on any one of said plurality of overlaid spherical medium surfaces.

11. An apparatus for optically recording and reproducing data, said apparatus comprising;

a base;

a stationary recording medium mounted to said base and having a semi-spherical medium surface on an inside surface of said recording medium, said semi-spherical medium surface having a semi-spherical surface and a center of curvature corresponding to the center of a spherical surface defined by said semi-spherical surface;

an optical head located at said center of curvature having a beam source for emitting a beam to said medium and a beam sensor for receiving and sensing a beam reflected from said recording medium;

supporting means for rotatably supporting said optical head about a rotational point, said rotational point being located at a center of a spherical surface defined by said semispherical surface; and an actuator for rotating said optical head.

12. An apparatus of claim 11, wherein said supporting means has a first supporting member for rotatably supporting said optical head about a first axis and a second supporting member for rotatably supporting the first supporting member with said optical head about a second axis, said first and second axis perpendicularly crossing each other at said center of said spherical surface; and wherein said actuator has a first motor for rotating said optical head about the first axis and a second motor for rotating the first supporting member with said optical head about the second axis.

13. An apparatus of claim 12, wherein said first motor is mounted on said optical head.

14. An apparatus of claim 12, wherein said second motor and said second supporting member are mounted on said base.

15. An apparatus of claim 14, wherein said first supporting member has a ring portion for rotatably supporting said optical head about the first axis;

wherein said second supporting member has sliding portions for slidably and rotatably supporting the ring portion; and wherein said second actuator slides and rotates the ring portion in the direction of a circumference of the ring portion.

16. An apparatus of claim 11, wherein said optical head has an objective lens and a focusing actuator, said focusing actuator focusing the objective lens on said medium surface.

17. An apparatus of claim 11, wherein said medium has a plurality of overlaid semi-spherical medium surfaces, each of said plurality of overlaid semispherical medium surfaces having a semi-spherical surface and a center of curvature, each of said center of curvatures being located on a same point; and wherein said optical head has an objective lens and a focusing actuator, said focusing actuator focusing the objective lens on any one of said plurality of overlaid semi-spherical medium surfaces.

18. A method for optically recording and reproducing data, said method comprising the steps of:

mounting a stationary recording medium to a base;

providing said recording medium with a spherical medium surface on an inside surface of said recording medium, said spherical medium surface having a center of curvature;

supporting an optical head at said center of curvature which is rotatable about said center of curvature;

emitting a beam to said recording medium using said optical head;

receiving and sensing a beam reflected from said recording medium using said optical head; and rotating said optical head.

19. A method of claim 18, further comprising the step of rotatably supporting said optical head about a first axis and a second axis, said first axis and said second axis perpendicularly crossing each other at said center of curvature.

20. A method for optically recording and reproducing data, said method comprising the steps of:

mounting a stationary recording medium to a base;

providing said recording medium with a semi-spherical medium surface on an inside surface of said recording medium, said semi-spherical medium surface having a center of curvature corresponding to the center of a spherical surface defined by said semi-spherical medium surface;

supporting an optical head at said center of curvature which is rotatable about said center of curvature;

emitting a beam to said recording medium using said optical head;

receiving and sensing a beam reflected from said recording medium using said optical head; and rotating said optical head.

21. A method of claim 20, further comprising the step of rotatably supporting said optical head about a first axis and a second axis, said first axis and said second axis perpendicularly crossing each other at said center of curvature.

* * * * *